INVENTOR.
Emanuel R. Lieberman

INVENTOR.
Emanuel R. Lieberman

United States Patent Office 3,221,372
Patented Dec. 7, 1965

3,221,372
APPARATUS FOR EXTRUDING
COLLAGEN FIBRILS
Emanuel R. Lieberman, Somerville, N.J., assignor to
Johnson & Johnson, a corporation of New Jersey
Filed Sept. 16, 1963, Ser. No. 310,516
4 Claims. (Cl. 18—14)

The present application is a continuation-in-part of my copending application Serial No. 58,593, filed September 20, 1960, and now abandoned.

This invention relates to the manufacture of tubular collagen products such as synthetic sausage casings, and more particularly to an improved apparatus for producing collagen tubing by continuous extrusion. The collagen tubing produced by the apparatus of the present invention is particularly adapted to be utilized as an edible casing for fresh pork sausages which must be cooked by the consumer, and sausages of the wiener or frankfurter type.

It has already been proposed to produce an artificial collagen casing from fibrous animal material, such as for example, dehaired hide which has been subjected to conventional liming treatments. The collagen in such fibrous material is converted by mechanical disintegration and the swelling action of acids into a plastic mass of fiber bundles and fibers which is then extruded to form a tube. However, when carrying out the aforesaid process, difficulty was experienced because of the tendency of the gross collagen fibers and fiber bundles to become oriented in the direction of extrusion. Orientation of these fibers in the direction of extrusion throughout the entire thickness of the casing is undesirable because the casing is readily split or torn lengthwise.

Prior investigators have attempted to produce extruded collagen casings of improved tear strength by a tangling, matting or felting action intended to impart a random orientation to the collagen fibers. The tear strength of the extruded casings is thereby improved, but for any given wall thickness, the longitudinal strength is decreased as the tear strength is increased. It is a disadvantage of prior extruding devices that, since they do little to homogenize the collagen fibers as they pass through the extruder, there are frequently weak sections in the wall of the extruded tube. For this reason, the haphazard arrangement of fibers obtained by the methods heretofore employed has not produced a satisfactory product. The recognition of these deficiencies is the foundation for the present invention.

It is an object of the present invention to provide an extrusion apparatus that will produce strong, thin-walled collagen casings in a simple and relatively inexpensive manner.

It is a further object of this invention to homogenize and control the orientation of swollen collagen fibrils as they are being extruded, whereby improved uniformity of the extruded product is obtained.

The foregoing and other objects may be attained in accordance with the present invention which provides a novel apparatus comprising an elongated passageway of annular cross-section defined by outer and inner walls concentric about an axis, and a fibril orientating member extending lengthwise of the annular passageway for a substantially large portion of its length and whose outer and inner walls are spaced, respectively, from the outer and inner walls of the annular passageway. The fibril orientation member also has the additional important function of homogenizing the mass of swollen collagen fibrils, i.e., promoting uniformity of its solids content. The swollen collagen fibrils are forced into, through and out of the extrusion nozzle into a dehydrating bath. The fibril orienting member is part of an assembly which is continuously rotated during the extrusion process to impart, in conjunction with the walls of the annular passageway, the unique orientation of the collagen fibrils that produces the desired strength in the finished casing.

The apparatus of the present invention enables one to extrude a collagen tube by causing a homogeneous mass of swollen collagen fibrils to flow under pressure through closed but separated zones concentric about a given longitudinal axis and imparting to the collagen fibrils flowing in a given region in each of the separated zones movement relatively rotational with respect to the movement of the collagen fibrils flowing in a different region of such zone whereby to produce in the respective zones a different directional orientation of the fibrils in the different regions thereof.

The invention will appear more clearly from the following detailed description when taken in connection with the accompanying drawings wherein.

The extrusion apparatus is designed to extrude collagen in the form of a tubular casing into the coagulating bath and its construction is such that the coagulating bath is caused to flow in contact with the outer wall of the casing and in contact with its inner wall as well (FIGS. 1, 2, 3 and 12). It includes in part a generally cylindrical outer housing 10 fixed on a supporting base plate 11, an inner hollow mandrel 12 concentrically disposed with respect to the housing, and which together with a nozzle barrel 13 supported at one end of the housing, forms a nozzle through which collagen is discharged into the coagulating bath.

Figure 1:
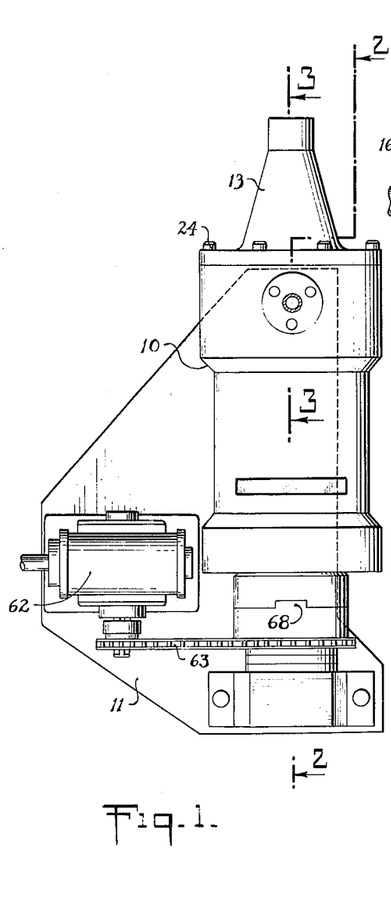
FIGURE 1 is a front elevation of a device incorporating improvements for extruding casings in accordance with the invention.
Figure 2:
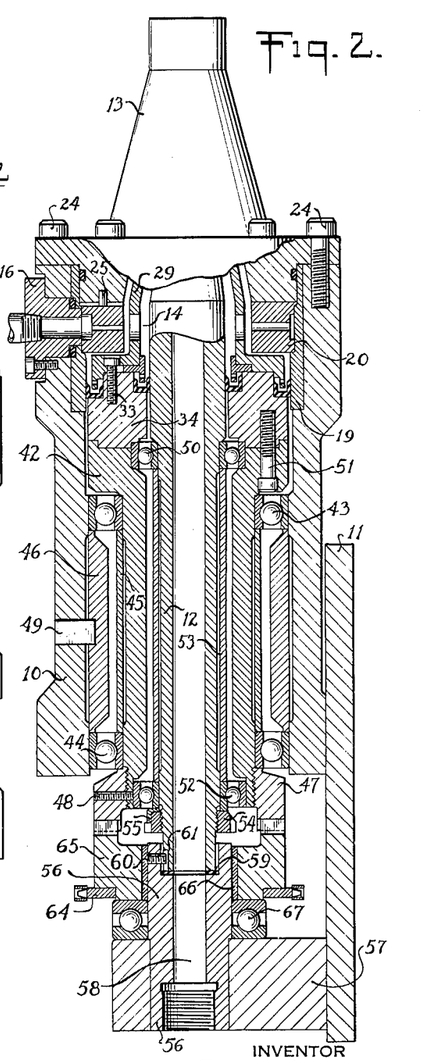
FIGURE 2 is a vertical sectional view taken along line 2—2 of FIGURE 1.

Near the upper end of the housing as viewed in FIGURE 2, there is presented a receiver chamber 14 to which the collagen is admitted under pressure and from which it is discharged through the nozzle into the coagulating bath. The collagen is admitted into the chamber through a gland 15 having a cylindrical body portion extending radially through the housing 10 and an outer flange portion 16 whose under surface engages a flat seat formed exteriorly in the outer wall of the housing and to which the gland is secured by headed screws 17 passing through holes in the flange and threaded into the housing wall. When the headed screws are pulled up tight, a gasket 18 is pressed between a shoulder formed by the reduced inner end of the gland and the outer surface of an underlying sleeve 19 which is recessed into the inner cylindrical wall of the housing, thereby to produce a fluid tight seal at this point.

Figure 3:
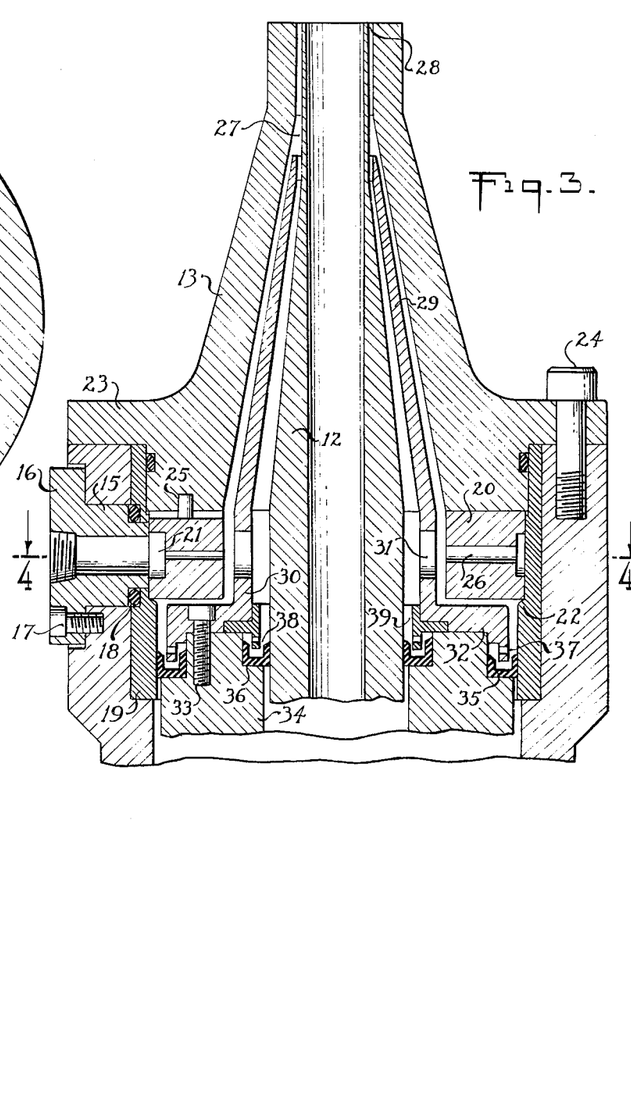
FIGURE 3 is a vertical sectional view taken along line 3—3 of FIGURE 1.
Figure 4:
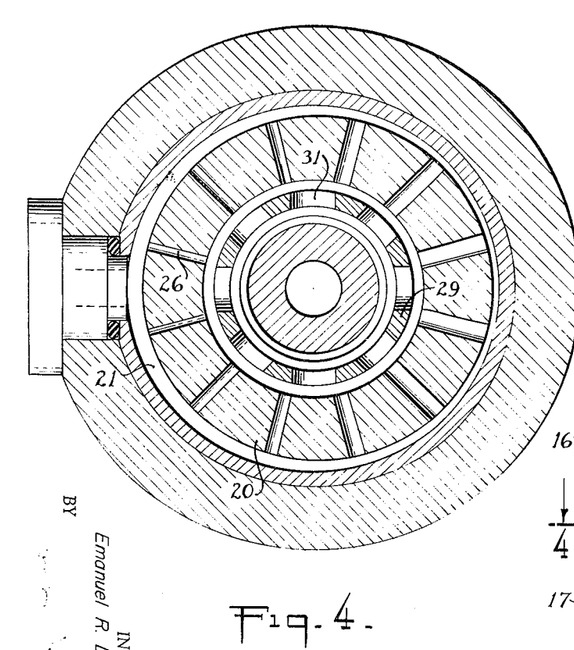
FIGURE 4 is a sectional view taken along line 4—4 of FIGURE 3.
Figure 5:
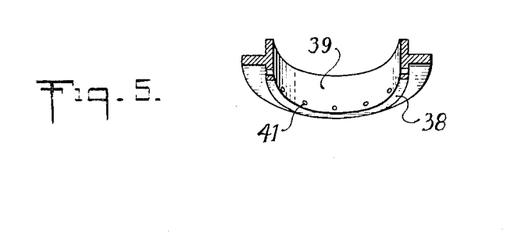
FIGURE 5 is a perspective sectional view of a sealing ring forming part of the rotatable assembly which includes the elongated member in the nozzle.

Upon entering, the collagen is distributed evenly throughout the receiving chamber 14 by an annular shaped distributing ring 20 disposed concentrically with respect to the mandrel 12 and whose inner cylindrical surface in cooperation with the outer cylindrical surface of the mandrel from which it is spaced in a radial direction defines in part the receiving chamber 14 which also is annular in shape (FIGS. 3 and 4).

The distributing ring 20 has an outer cylindrical surface which, except for a groove 21 formed therein around its periphery, fits flush against the inner wall of the cylindrical sleeve 19 to which reference has been made. The position of the distributing ring 20 lengthwise of the mandrel is determined by a shoulder 22 raised from the inner wall of the cylindrical sleeve and against which the sleeve is held by the nozzle barrel 13. The nozzle barrel for this purpose is formed where it adjoins the cylindrical housing 10 with a flange 23 of diameter equal to the outer diameter of the housing. This flange, however, is reduced in diameter for a part of its thickness to present a smaller portion which just fits into the cylindrical sleeve 19 and a larger portion which just fits into the cylindrical housing at its end. The flange is secured to the housing by headed screws 24 passing through suitably disposed holes in such larger portion and threaded endwise into the housing wall. Rotational movement of the distributing ring 20 about its axis is presented by a pin 25 fitted into a hole drilled in the nozzle barrel flange in its inner face and which protrudes from said face and into a groove formed in the adjacent face of the distributing ring.

Figure 7:
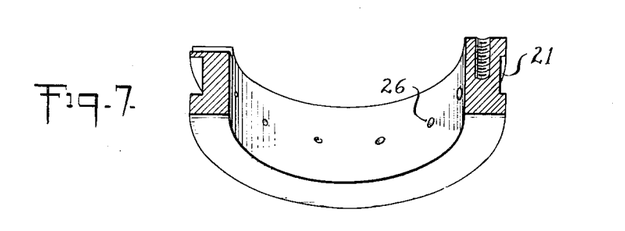
FIGURE 7 is a perspective sectional view of a ring through which the collagen is distributed to the nozzle.

To complete its description, the distributing ring 20 is formed in its outer peripheral surface with the groove 21 of constant width preferably equal to or larger than the diameter of the entrance port in the gland 15 and with which the groove is in lateral registry (FIGS. 3, 4 and 7). The groove 21 varies in depth uniformly and in both directions from a region of greatest depth opposite the entrance port to a region of least depth at a point diametrically opposite the entrance port. Access from the groove 21 to the collagen receiving chamber 14 is provided by a series of radially disposed passageways 26 (the drawing shows twelve) preferably spaced equally about the periphery of the ring and which respectively vary in diameter usually in uniform increments from the smallest adjacent to the inlet port in the gland where the groove has its greatest depth to the largest in the region diametrically opposed therefrom where the groove has its smallest depth. In accordance with this arrangement, delivery of the collagen to the receiving chamber 14 is substantially uniform in all regions thereof.

The collagen is discharged from the receiving chamber 14 volumetrically at the same rate as it is delivered to the chamber and the force that effects its delivery is the same force that effects its discharge. Discharge of the collagen is through an elongated nozzle passageway 27 annular in cross-section and which is defined by the inner wall of the hollow nozzle barrel 13 and the outer wall of its concentrically disposed hollow mandrel 12. The entrance end of the annular nozzle passageway 27 is coextensive and in registry with the discharge end of the annular receiving chamber 14, but from there the outermost wall of the mandrel which is of constant diameter throughout the extent of the receiving chamber, tapers gradually but uniformly as the exit end of the nozzle is approached to a point where the diameter again becomes constant though smaller. This diameter remains constant from that point to an orifice 28 at the end of the nozzle and from which the collagen is discharged. The inner wall of the nozzle barrel 13 likewise tapers uniformly from its entrance and to a point just beyond where the mandrel diameter becomes constant, whereupon it, too, remains constant for the remainder of the distance to the outlet orifice. While both walls of the elongated annular passageway 27 taper uniformly, one tapers at a greater rate than the other so that the cross-sectional area of the annular passageway not only diminishes but indeed the difference between its outer and inner diameters diminishes too. The final difference in diameter size, which determines the wall thickness of the collagen casing as it is discharged, remains constant for a certain distance inwardly from the end of the orifice 28.

While the volumetric flow of collagen is constant in the nozzle as thus far described, the rate of linear travel or velocity of flow increases as the nozzle orifice is approached with the result that the orientation of the swollen collagen fibrils in the direction of flow is enhanced. While this promotes strength in the direction of extrusion, it tends to diminish strength in a direction at right angles thereto. To obviate this, the nozzle is provided with a device 29 which not only promotes homogenization of the mass of swollen collagen fibrils as it travels through the nozzle, but also effects an orientation of the fibrils interiorly of the casing walls at predetermined angles with respect to the direction of orientation of the fibrils immediately adjacent the casing wall (FIGS. 2, 3, 4 and 6).

The fibril orienting device 29 is mounted concentrically about the axis of the mandrel 12 for relative rotation with respect thereto and comprises in part a cylindrical base portion 30 disposed in the annular collagen receiving chamber 14 with its outer and inner surfaces spaced from the inner and outer surfaces respectively of the distributing ring 20 and of the mandrel. The device 29 further includes an elongated hollow truncated portion extending from the cylindrical base portion 30 into the elongated tapered annular extrusion chamber to a point about midway between where the mandrel and the nozzle barrel present their reduced uniform diameters. The wall of the truncated portion presents outer and inner surfaces spaced from the inner and outer tapering walls respectively of the nozzle barrel 13 and the mandrel 12, and said wall also tapers gradually in thickness as it approaches the orifice 28 so that, in effect, it divides the elongated annular extrusion chamber previously described into two concentric annular chambers separated during the operation of the device by a rotating wall. This wall, in its outer terminal region to the extent that it overlaps the reduced wall portion of uniform diameter presented by the mandrel, is itself of uniform internal diameter.

Figure 6:
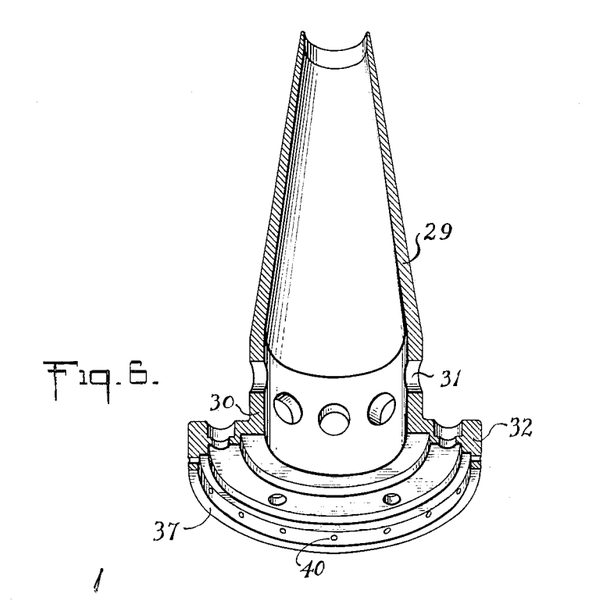
FIGURE 6 is a perspective longitudinal sectional view of the elongated member forming part of the rotatable assembly in the nozzle.

The cylindrical base section 30 of the rotatable elongated member 29, i.e., the section within the receiving chamber 14, is formed with a plurality of relatively large holes 31 spaced uniformly around the circumference of the section and which give to the collagen entering the receiving chamber equal access to both the concentric annular extrusion chambers. According to this arrangement, collagen fed into the device enters the receiving chamber 14 and passes to both sides of the rotating partition 29. As the collagen is forced through the nozzle, rotation of the elongated partition member serves to maintain the collagen in a homogenized condition and at the same time orients the fibrils adjacent the partition at a given angle depending upon its speed of rotation with respect to the rate of extrusion. The fibrils adjacent the barrel and mandrel surfaces, in the meantime, are oriented in the direction of extrusion with the result that there is imparted to the extruded casing a composite structure hereinelsewhere more fully described. The rotatable elongated member 29 is mounted for rotation on an assembly disposed within the housing but which is sealed from the collagen receiving chamber 14 to facilitate normal operation of the parts. To this end, the cylindrical portion 30 of the rotatable member presents at its inner end a radially extending flange 32 of external diameter slightly smaller than the internal diameter of the sleeve 19 which helps position the distributing ring (FIGS. 3 and 6).

The flange 32 is fastened by screws 33 at one end of an annular element 34 disposed concentrically with respect to the mandrel 12 but in spaced relation therewith and with the outer surrounding housing 10. Annular element 34 is mounted for rotation in a manner which hereinafter is described (FIGS. 2 and 3). It is notched in its outer and inner peripheral edges adjacent the flange 32 to accommodate cup ring seals 35 and 36 which seal off the receiving chamber while a peripheral flange 37 on the fibril orienting member 29 and a flange 38 on a T-shaped sealing ring 39 interposed between member 29 an annular member 34 extend into the cup seals on which pressure is equalized by a series of circumferentially spaced holes 40 and 41 provided in each of said flanges.

The annular member 34 on which the fibril orienting member 29 is secured forms part of an assembly disposed in the annular space between the mandrel 12 and the housing and which is rotatable with respect to both. In addition to annular member 34, the assembly further includes a relatively long hollow cylindrical member 42 encircling the mandrel and which, except for an enlarged portion adjacent to and having the same diameter as the annular member 34, has its cylindrical wall reduced in diameter to accommodate two sets of coaxially spaced ball bearings 43 and 44 between the hollow cylindrical member 42 and the housing 10 to provide for relative rotation between them. The location of the bearings 43 and 44 and their spacing lengthwise of the rotatable cylindrical member 42 are determined by the abutment of one bearing against the enlarged portion at one end of said cylindrical member, by a pair of intermediate concentrically disposed spacer sleeves 45 and 46 of which the inner one is arranged adjacent the cylindrical member 42 and the outer one adjacent the housing 10, and by a nut 47 threaded up on the cylindrical member at its other end and into an abutting relation with the second bearing 44. A screw 48 threaded radially through the nut and into the cylindrical member 42 maintains their proper relative adjustment. A key 49 extending through the housing 10 and into a groove formed in the outer spacer sleeve 46 prevents relative movement of the rotatable assembly in an axial direction.

In addition to serving as the means through which the fibril orienting member 29 is rotated, the rotatable assembly serves the additional function of supporting the mandrel 12 in its position coaxially with respect to the other elements making up the nozzle. For this purpose, the cylindrical member 42 and the annular member 34 which comprises the rotatable assembly are recessed in their inner walls where they abut each other endwise to present a groove which accommodates a ball bearing 50. The integrity of the groove is maintained to give the bearing a fixed position endwise of the rotatable assembly by a series of screws 51 passing through holes spaced around the enlarged end portion of the cylindrical member 42 and threaded into the annular member 34. These members incidentally have a tongue-and-groove connection at their outer peripheral edges to ensure their coaxial relationship. The bearing 50 encircles and supports the mandrel 12 at one position along its length. The mandrel 12 is similarly supported by an identical bearing 52 at a different position along its length and which is accommodated in a recess formed in the cylindrical member 42 at its other end. By recessing the outer wall of the mandrel to fit the bearings 50 and 52 and to present a shoulder against which the first bearing 50 seats, and by providing a sleeve 53 encircling the mandrel to space the bearings, and finally by threading a nut 54 on the end of the mandrel against the second bearing to hold it against the spacing sleeve 53, not only is the mandrel 12 supported coaxially in respect to the rotatable assembly and the housing but its endwise position with respect to these units is also determined. It follows, therefore, that the position of the nozzle barrel 13 supported by the housing and the position of the fibril orienting member 29 supported by the rotatable assembly are correspondingly determined with respect to the mandrel 12. A lock washer 55 prevents the bearing retaining nut 54 from backing off from its proper position of adjustment.

An end portion of the mandrel 12 extending beyond the bearing retaining nut 54 protrudes endwise into a hollow cylindrical insert 56 fixed in a supporting bracket 57 secured to the base plate 11. The cylindrical insert has a bore 58 corresponding in size to that of the mandrel and it is suitably recessed to receive the mandrel's protruding end.

Rotation of the rotatable assembly is effected from a source of power (not shown) through a reduction gear 62 and a chain drive 63 to a sprocket 64 fixed on a sprocket carrying member 65 rotatably arranged on a bushing 66 encircling the cylindrical insert 56 and which is buttressed by a thrust bearing 67 interposed between it and the supporting bracket 57. A tongue-and-groove connection 68 between the sprocket carrying member 65 and the nut 47 forming part of the rotatable assembly completes the driving connection. A gasket 59 between the shoulder of the insert 56 and the protruding end of the mandrel produces a fluid tight seal and a set screw 60 threaded radially through the wall of the insert 56 and into a longitudinal recess 61 formed in the outer wall of the mandrel holds the mandrel against turning with the rotatable assembly by which it is supported.

Figure 8:
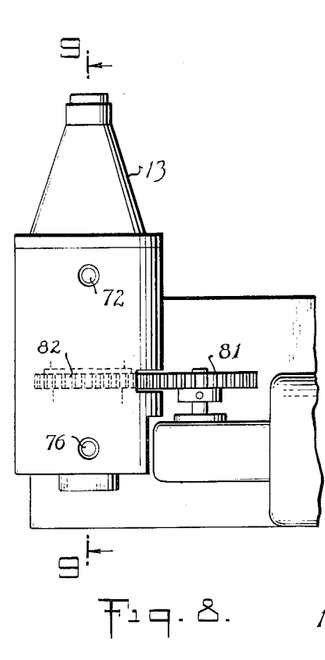
FIGURE 8 is a modified form of extruder.
Figure 9:
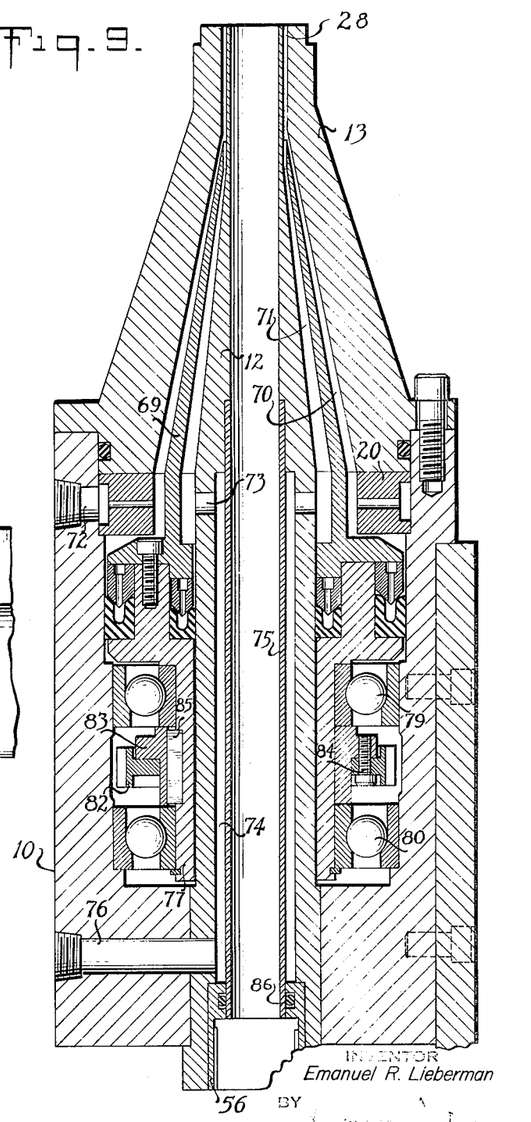
FIGURE 9 is a vertical sectional view of the extruder of FIGURE 8 taken along line 9—9.

FIGURES 8 and 9 illustrate a modification of the apparatus illustrated in FIGURES 1 through 7. This extruder is designed to extrude collagen from two separate sources in the form of a tubular casing into a coagulating bath and again its construction is such that the coagulating bath is caused to flow in contact with the outer wall of the casing and in contact with the inner wall. The outer wall of the casing, however, is formed from one mass of swollen collagen fibrils and the inner wall of the casing may, at the option of the operator, be formed from another collagen source which can differ from the first collagen mass for example, in the amount and type of additives. Thus, if desired, two different sources of collagen may be used to form a casing whose outer wall differs from the inner wall. A tanning agent, for example, may be added to one portion of the collagen mass to obtain a casing with a tanned outer layer and an untanned inner layer. The extruder, therefore, permits the extrusion of a casing whose outer wall and inner wall have different physical properties.

Referring now to FIGURE 9, the modified extruder differs from the one previously described in the construction of the concentrically disposed fibril orienting device 69, which unlike the elongated member 29 illustrated in FIGURES 2 and 6 is not perforated by the holes 31. The device 69 is mounted concentrically about the axis of the mandrel 12 for relative rotation with respect thereto and the wall of this member 69 divides the elongated tapered annular extrusion chamber between the inner surface of the nozzle and the outer surface of the mandrel into two concentric annular spaces 70 and 71.

The collagen that is discharged through the orifice 28 from the outer annular space 70 is admitted under pressure into an upper entry port 72 that passes through the housing 10, and distributed by the ring 20, which has been described above.

The collagen that is discharged through the orifice 28 from the inner annular space 71 enters this space through radial orifices 73 in the mandrel 12, which orifices communicate with an elongated annular receiving chamber 74, defined by the recess wall of the mandrel 12 and the outer wall of a cylindrical insert 75, the bore of which corresponds in size to that of the mandrel. The lower end of the mandrel 12 is bored to present a shoulder against which the cylindrical insert 56 seats. This insert is fitted to the cylinder 75 and is notched to receive a pressure seal 86, thus effectively isolating the receiving chamber 74 from the coagulating solution flowing through the hollow mandrel. The second collagen mass is admitted under pressure to the receiving chamber 74 through the lower entry port 76 that passes through the housing.

Annular member 77, to which the fibril orienting member 29 is secured by the headed screw 78, is disposed in the annular space between the mandrel 12 and the housing 10 and is rotatable with respect to both. The inner cylindrical wall of the housing is enlarged in diameter to accommodate two sets of ball bearings 79 and 80 between the housing and the annular member and to provide for relative rotation between them.

Rotation of the member 77 is effected from a source of power (not shown) through a driving gear 81 which engages a gear 82. The gear 82 is secured to a flange 83 by a screw 84 and the flange 83 is locked to the member 77 by the key 85 which prevents relative rotation between the member 77 and its driving flange.

In operating the extruder illustrated in FIGURES 8 and 9, the volumetric flow of the collagen through the entry ports 72 and 76 is preferably equal and constant. Rotation of the orienting device 69 orients those collagen fibrils adjacent the rotating wall at an angle to the direction of extrusion. The two collagen masses in the concentric annular spaces 70 and 71 conflow as they pass the end of the elongated member 69 at a point just beyond where the mandrel diameter becomes constant and are united as they are discharged through the nozzle passageway of uniform diameter defined by the inner wall of the nozzle 13 and the outer wall of the mandrel.

Exceptionally strong and uniform casings may be extruded using a mass of swollen collagen fibrils containing, e.g., 3 to 7% by weight collagen solids, and rotating the impeller, e.g., at about 106 to about 285 r.p.m. To prevent an increase in the temperature of the collagen mass that otherwise would be caused by the work done on the collagen during its passage through the extruder, it is desirable to surround a section of the extruded near the entry port and rotating cylindrical member with a water jacket or suitable heat exchanger.

Throughout the specification and examples that follow, all quantities are expressed in parts by weight unless otherwise indicated.

EXAMPLE I

*Preparation of swollen unsheathed collagen fibrils*

Fresh steer hides are washed with cold water at 13° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and composites are prepared from five hides. The hide composites are then cut into ½ to 4 square inch sections and reduced to pulp by three passes through a meat grinder, each pass being a finer grind. The first and second passes are through 18 and 8 millimeter holes respectively. The final grind is through holes 1.5 millimeters in diameter. It is desirable during the grinding process to keep the pulp below 20° C. This may be done by adding crushed ice to the hides as they are fed to the grinder.

The ground pulp is next diluted with tap water at 16° C. to give a smooth slurry containing 7.4% dry solids.

This slurry (125 parts) is then treated with 125 parts of a 2.4% lactic acid solution using an inline mixer to form a homogenous mass of swollen collagen fibrils. It is important during this acid swelling step that the temperature be maintained below about 25° C. The mixture so obtained contained 3.7% hide solids and 1.2% lactic acid. After the pulp is blended with acid, the mass of swollen collagen fibrils is further dispersed in a suitable homogenizer fitted with a 2-stage valve and operated with a 1500 p.s.i. drop per stage. The swollen collagen fibrils are then filtered through a 7-mil filter screen to remove non-swellable tissue fragments and any large fibers or fiber bundles that may remain.

EXAMPLE II

*Extrusion of the swollen collagen fibrils*

The homogenized swollen collagen fibrils prepared as described above may be extruded into a coagulating bath to form a continuous tube in which the collagen fibrils are positioned in concentric layers. It is preferred to extrude the swollen collagen fibrils vertically upward.

Figure 10:
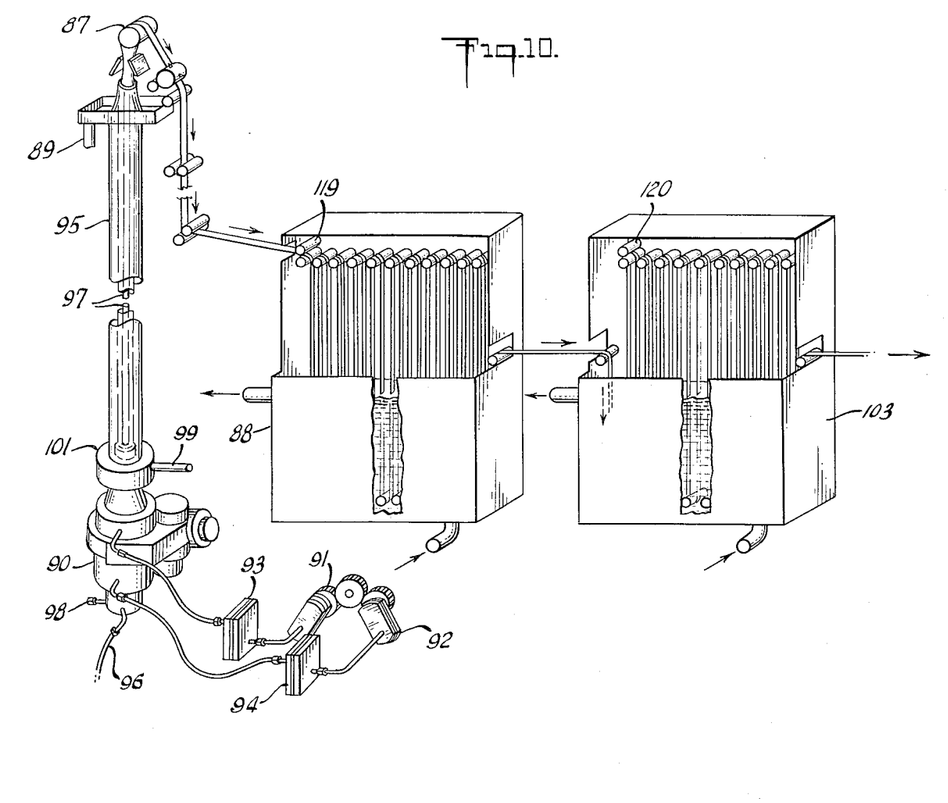
FIGURES 10 and 11 are flow diagrams illustrating the sequence of steps in the continuous manufacture of collagen casing.

Referring now to FIGURE 10, it will be noted that the extruder 90 is of the type illustrated in FIGURES 8 and 9. Suitable metering pumps 91 and 92 are employed to extrude the swollen collagen fibrils through screen filters 93 and 94 into a coagulating bath circulating through a vertical column 95. The coagulating bath may be a 42% solution of technical grade ammonium sulfate in water. The pH of the coagulating bath is preferably adjusted to about 7 with ammonium hydroxide, and the temperature of the coagulating bath, and all baths employed throughout the process of the present example to treat the extruded casing, are maintained below 25° C.

It will be noted that the swollen collagen fibrils are extruded into a coagulating bath recirculating in an enclosed system. The extruded casing tube is pulled vertically upward out of the bath by a driven roller 87, and enters a coagulating bath of similar composition which is circulated through a tank 88.

Figure 12:
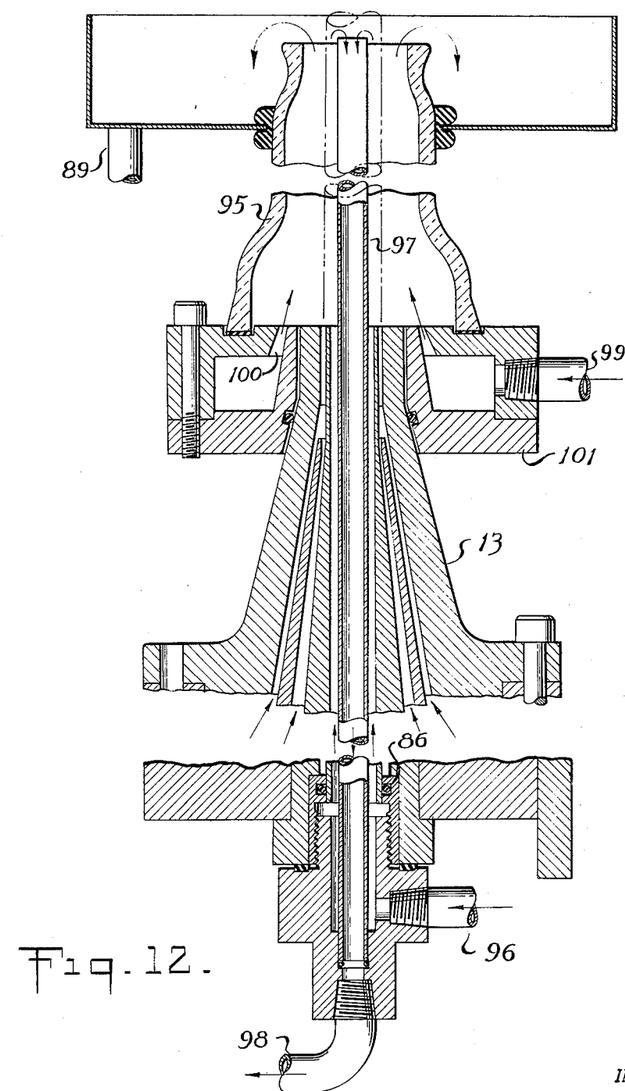
FIGURE 12 is a vertical sectional view illustrating the flow of the dehydrating bath and collagen through the extruder.

The circulation of the coagulating bath through the vertical column 95 in contact with the inner and outer walls of the extruded casing is best illustrated by FIGURE 12. A portion of this bath enters at the bottom of the extruder through a conduit 96 and flows vertically upward within the extruded casing passing between the extruded casing and an overflow tube 97. This liquid returns through the overflow tube 97, which extends to the top of the column, and an exit conduit 98. Another portion of the coagulating bath enters the bottom of the column 95 through a conduit 99 and an annular opening 100 in a distributor 101 that surrounds the extruder nozzle 13. This portion of the coagulating bath flows vertically upward in the column outside the extruded casing, and returns through an overflow drain 89. The flow rate within the extruded casing (through conduit 96) may be, e.g., about 1 gallon per hour. This inside flow of the coagulating liquid is most helpful when starting up the extruder. The flow rate outside of the extruded casing (through conduit 99) may be, e.g., about 2 gallons per minute.

Referring again to FIGURE 10, the driven roller 87 transports the extruded casing through the column 95, whose length is such as to maintain the casing in contact with the bath for about a minute or less. The casing is then perforated and enters an afterbath 88 containing concentrated ammonium sulfate solution from which it emerges after deswelling is substantially completed, e.g., after about 5 minutes.

The casing next enters a more dilute solution of ammonium sulfate contained in the tank 103. This solution is approximately neutral and contains from about 4 to 10% ammonium sulfate. The dwell time in this tank is about 6 minutes, during which time the concentration of salt solution that is occluded by the wet casing is reduced to a value corresponding to the concentration of ammonium sulfate in the tank 103. It is necessary to reduce the amount of salt that is present in the casing since the alum solution that is subsequently used to harden the collagen tube will not react with the collagen fibrils in the presence of excessive amounts of ammonium sulfate.

Figure 11:
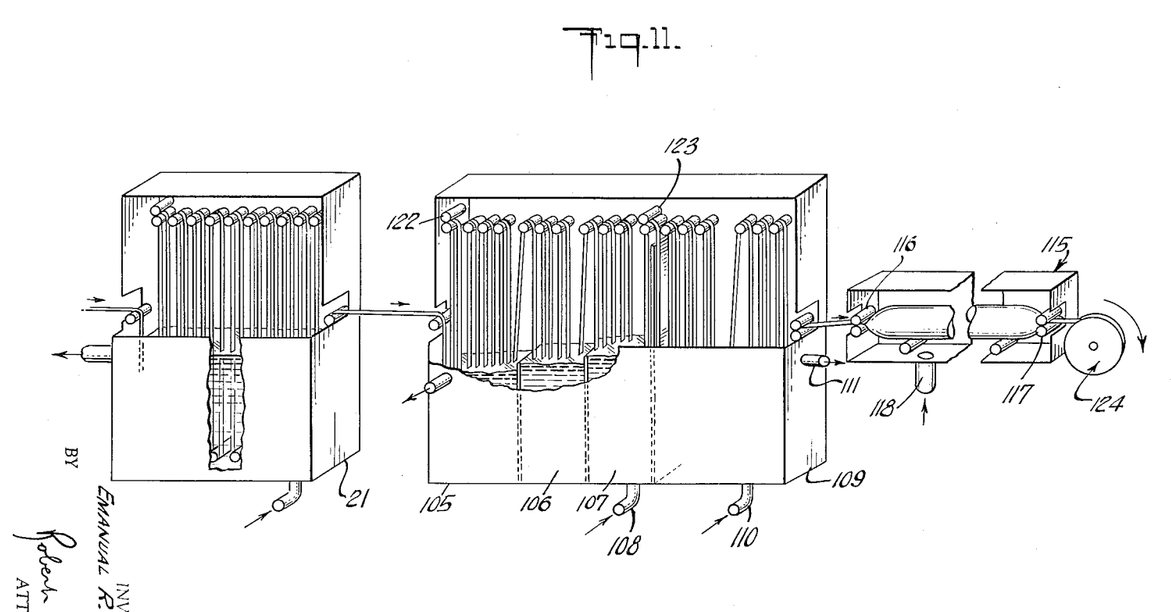

Referring now to FIGURE 11, the collagen casing prior to washing is hardened in tank 21 which contains an alum hardening bath. This bath may be a solution of about 12% alum [$NH_4Al(SO_4)_2 \cdot 24H_2O$], about 8% ammonium sulfate and about 2.8% citric acid adjusted to pH 4.3.

Washing takes place in tanks 105, 106, and 107 which conveniently may be separated by side walls of decreasing height. Thus fresh wash water enters the tank 107 through a conduit 108 and overflows into tank 106 and tank 105. The total washing time is about 14 minutes, which time is sufficient to substantially remove the occluded soluble components. The washed casing then passes into a bath 109, containing a plasticizing agent such as about 6% glycerine in water. The dwell time in this bath is about 5 minutes. The plasticizing bath enters tank 109 through the conduit 110 and overflows through conduit 111.

The excess water is removed from the casing as it travels through the chamber 115. A section of the casing which is within the drying chamber, between rollers 116 and 117, is maintained in an inflated condition with a captive air bubble and forced warm air, e.g., at a temperature of about 60–70° C. enters the drying chamber through conduit 118. The dwell time in the drier 115 is about 9 minutes. An improved method and apparatus for inflating and drying an extruded collagen casing is described and claimed in co-pending application Serial No. 260,631, filed February 25, 1963.

The extruded casing is conveyed through the system by driven rollers 87, 119, 120, 121, 122, 123, 116 and 117 and is collected on a takeup reel 124. The casing may be subjected to further heat treatment at about 80° C. and about 20–30% relative humidity for about 24 hours. This additional heat-curing step may be eliminated if a small amount of formaldehyde (as little as 20 parts per million) is added to the hardening or plasticizing bath. The casing, after this heat-curing step, will contain from about 10% to about 30% by weight of moisture and will pick up additional moisture if allowed to equilibrate at room temperature and humidity. Such casings will stuff satisfactorily if equilibrated at room temperature and a relative humidity of about 75%. To maintain the desired moisture content for stuffing, the so-rehumidified casings are preferably packaged in hermetically sealed containers of metal foil or the like.

While the invention has been described in detail according to the preferred manner of carrying out the process and yielding the products, it will be obvious to those skilled in the art, after understanding the invention, that changes and modifications may be made therein without departing from the spirit or scope of the invention, and it is intended in the appended claims to cover such changes and modifications.

What is claimed is:

1. A nozzle for extruding swollen collagen fibrils in the form of a tube suitable for a sausage casing, comprising an elongated chamber defined by inner and outer walls, a partitioning member therebetween to divide the flow of the collagen, means for rotating the partitioning member to orient the collagen fibrils in the vicinity of said partitioning member at an angle to the direction of flow, and a nozzle section at the discharge end of the elongated chamber in which the divided flow of collagen from the elongated chamber is merged.

2. A nozzle for extruding swollen collagen fibrils in the form of a tube suitable for a sausage casing comprising an elongated chamber having inlet and discharge ends and defined by inner and outer walls concentric about an axis and through which the collagen is adapted to flow, said chamber being annular in form and for at least a portion of its length of gradually diminishing cross-sectional area, a partitioning wall concentric about said axis and extending lengthwise of said chamber in the portion thereof of gradually diminishing cross-sectional area and which is disposed in spaced relation with both the inner and outer walls, said partitioning wall serving to divide the flow of the collagen as it passes through the chamber, means for rotating the partitioning wall about its axis to orient fibrils in the vicinity thereof at an angle to the direction of flow of the collagen in its travel from the inlet to the discharge end of the chamber, and a nozzle section at the discharge end of the elongated chamber in which the divided flow of collagen from the elongated chamber is merged.

3. A nozzle for extruding swollen collagen fibrils in the form of a tube suitable for a sausage casing comprising an elongated chamber having inlet and discharge ends and defined by inner and outer walls and concentric about an axis and through which the collagen is adapted to flow, said chamber being annular in form and for at least a portion of its length of gradually diminishing cross-sectional area, a partitioning wall concentric about said axis and extending lengthwise of said chamber in the portion thereof of gradually diminishing cross-sectional area and which is disposed in spaced relation with both the inner and outer walls, said partitioning wall serving to divide the flow of the collagen as it passes through the chamber, means for rotating the partitioning wall about its axis to orient fibrils in the vicinity thereof at an angle to the direction of flow of the collagen in its travel from the inlet to the discharge end of the chamber, a nozzle section at the discharge end of the elongated chamber in which the divided flow of the collagen from the elongated chamber is merged, and means for admitting the collagen to the elongated chamber at both sides of the partitioning wall.

4. A nozzle for extruding swollen collagen fibrils in the form of a tube suitable for a sausage casing comprising an elongated chamber having inlet and discharge ends and defined by inner and outer walls concentric about an axis and through which the collagen is adapted to flow, said chamber being annular in form and for at least a portion of its length of gradually diminishing cross-sectional area, a partitioning wall concentric about said axis and extending lengthwise of said chamber in the portion thereof of gradually diminishing cross-sectional area and which is disposed in spaced relation with both the inner and outer walls, said partitioning wall serving to divide the flow of the collagen as it passes through the chamber, means for rotating the partitioning wall about its axis to orient the collagen fibrils in the vicinity thereof at an angle to the direction of flow of the collagen in its travel from the inlet to the discharge end of the chamber, a nozzle section at the discharge end of the elongated chamber in which the divided flow of collagen from the elongated chamber is merged, a collagen receiving chamber at the inlet end of the elongated chamber, and a distributing ring located in said chamber for distributing the collagen received in the chamber substantially equally within said elongated chamber, said ring comprising a peripheral groove of capacity decreasing with distance away from an entrance to the receiving chamber and a plurality of radially extending passageways spaced around the groove of capacity increasing with their distance away from the entrance to the receiving chamber.

References Cited by the Examiner

UNITED STATES PATENTS

| | | | |
|---|---|---|---|
| 2,046,541 | 7/1936 | Becker | 18—14 |
| 2,139,414 | 12/1938 | Lee | 264—176 X |
| 2,161,908 | 6/1939 | Becker | 18—14 |
| 2,676,356 | 4/1954 | Becker | 18—14 |
| 2,803,042 | 8/1957 | Lundh | 18—14 |
| 2,896,254 | 7/1959 | Braun | 18—14 |
| 3,074,106 | 1/1963 | Eberman | 18—12 |

FOREIGN PATENTS

| | | |
|---|---|---|
| 167,559 | 4/1955 | Australia. |
| 659,706 | 5/1938 | Germany. |
| 639,538 | 6/1950 | Great Britain. |

J. SPENCER OVERHOLSER, *Primary Examiner.*

MICHAEL V. BRINDISI, WILLIAM J. STEPHENSON, *Examiners.*